United States Patent
Chang

(10) Patent No.: US 11,815,220 B1
(45) Date of Patent: Nov. 14, 2023

(54) BRACKET

(71) Applicant: ELGATO IDISPLAY LIMITED, New Taipei (TW)

(72) Inventor: Yu-Cheng Chang, New Taipei (TW)

(73) Assignee: ELGATO IDISPLAY LIMITED, New Taipei (TW)

( * ) Notice: Subject to any disclaimer, the term of this patent is extended or adjusted under 35 U.S.C. 154(b) by 0 days.

(21) Appl. No.: 18/079,121

(22) Filed: Dec. 12, 2022

(30) Foreign Application Priority Data

Sep. 5, 2022 (TW) .................................. 111133480

(51) Int. Cl.
*F16M 11/16* (2006.01)
*F16M 11/24* (2006.01)

(52) U.S. Cl.
CPC ........... *F16M 11/16* (2013.01); *F16M 11/245* (2013.01)

(58) Field of Classification Search
CPC ............................. F16M 11/16; F16M 11/245
See application file for complete search history.

(56) References Cited

U.S. PATENT DOCUMENTS

| | | | | |
|---|---|---|---|---|
| 6,109,573 A * | 8/2000 | Liao | ...................... | F16M 11/10 403/92 |
| 6,820,845 B2 * | 11/2004 | Nakatani | ................ | F16M 11/16 248/177.1 |
| 10,330,245 B2 * | 6/2019 | Meuret | .................. | F16M 11/34 |
| 10,738,938 B2 * | 8/2020 | Becker | .................. | F16M 11/36 |

* cited by examiner

*Primary Examiner* — Anita M King
(74) *Attorney, Agent, or Firm* — Li & Cai Intellectual Property (USA) Office

(57) ABSTRACT

A bracket that includes a fixing seat and three supporting assemblies is provided. The fixing seat includes three engaging portions, each of which includes multiple first engaging structures. Each supporting assembly includes a fixing assembly, a sliding member, and an engaging member. One end of the fixing assembly is pivotally connected to the engaging portion. The sliding member is sleeved around an outer periphery of the fixing assembly. The engaging member is connected to the fixing assembly. When the sliding member slides relative to the fixing assembly, the sliding member can push against the engaging member, such that a second engaging structure of the engaging member is engaged with the first engaging structure. Further, a second retaining structure of the sliding member can be engaged with a first retaining structure of the fixing assembly for limiting a movement range of the engaging member and the fixing assembly.

10 Claims, 8 Drawing Sheets

BRACKET

CROSS-REFERENCE TO RELATED PATENT APPLICATION

This application claims the benefit of priority to Taiwan Patent Application No. 111133480, filed on Sep. 5, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a bracket, and more particularly to a bracket with an adjustable angle.

BACKGROUND OF THE DISCLOSURE

A conventional bracket with an adjustable angle has an issue of being inconvenient in operation.

SUMMARY OF THE DISCLOSURE

In response to the above-referenced technical inadequacy, the present disclosure provides a bracket mainly configured to improve on inconveniences of operating a conventional bracket.

In one aspect, the present disclosure provides a bracket configured to be disposed on a carrying surface. The bracket includes a fixing seat and at least three supporting assemblies. The fixing seat includes at least three engaging portions. Each of the at least three engaging portions includes a plurality of first engaging structures. Each of the at least three supporting assemblies includes a fixing assembly, a sliding member, and an engaging member. The fixing assembly has one end pivotally connected to one of the at least three engaging portions. The fixing assembly includes a first positioning structure. The sliding member is sleeved around an outer periphery of the fixing assembly. The sliding member includes a second positioning structure, and the second positioning structure is configured to be engaged with the first positioning structure. The engaging member is connected to the fixing assembly. The engaging member is configured to move relative to the fixing assembly, the engaging member includes a second engaging structure, and the second engaging structure is configured to be engaged with any adjacent one of the first engaging structures. The sliding member is operable to move between an unlocked position and a fixed position relative to the fixing assembly. When the sliding member moves from the unlocked position to the fixed position, the second engaging structure is engaged with the adjacent one of the first engaging structures due to the sliding member pushing against the engaging member, and, the second positioning structure is engaged with the first positioning structure, such that a movement range of the engaging member is limited by the sliding member and the fixing member. When the sliding member moves to the unlocked positon, the engaging member is operable to move relative to the fixing assembly, such that the second engaging structure is no longer engaged with the adjacent one of the first engaging structures.

Therefore, in the bracket provided by the present disclosure, through the configuration of the fixing seat and the fixing assembly, the engaging member, and the sliding member included in each of the supporting assemblies, a user can quickly and conveniently adjust an angle of the bracket.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
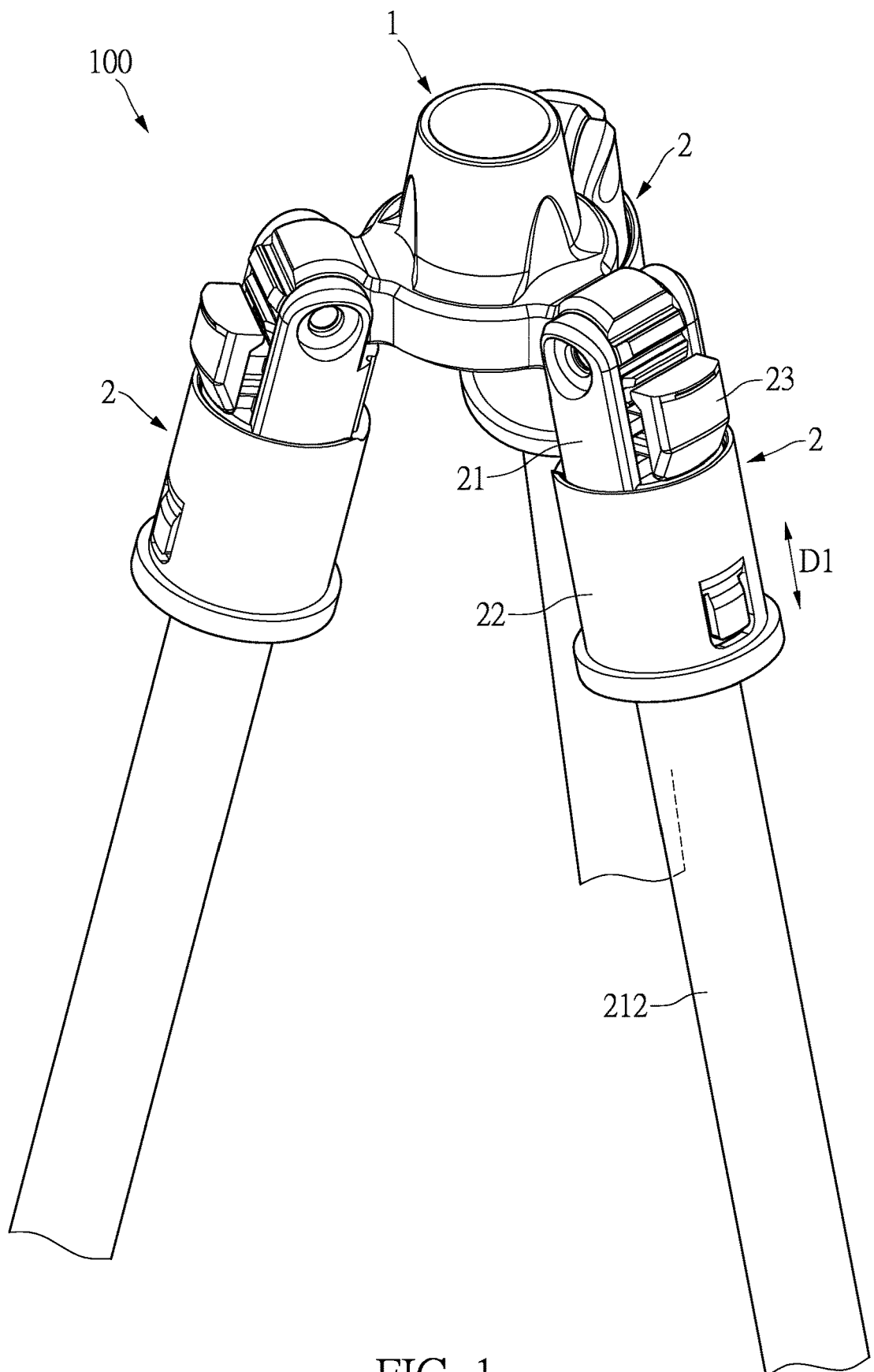
FIG. 1 is a schematic view of a bracket according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
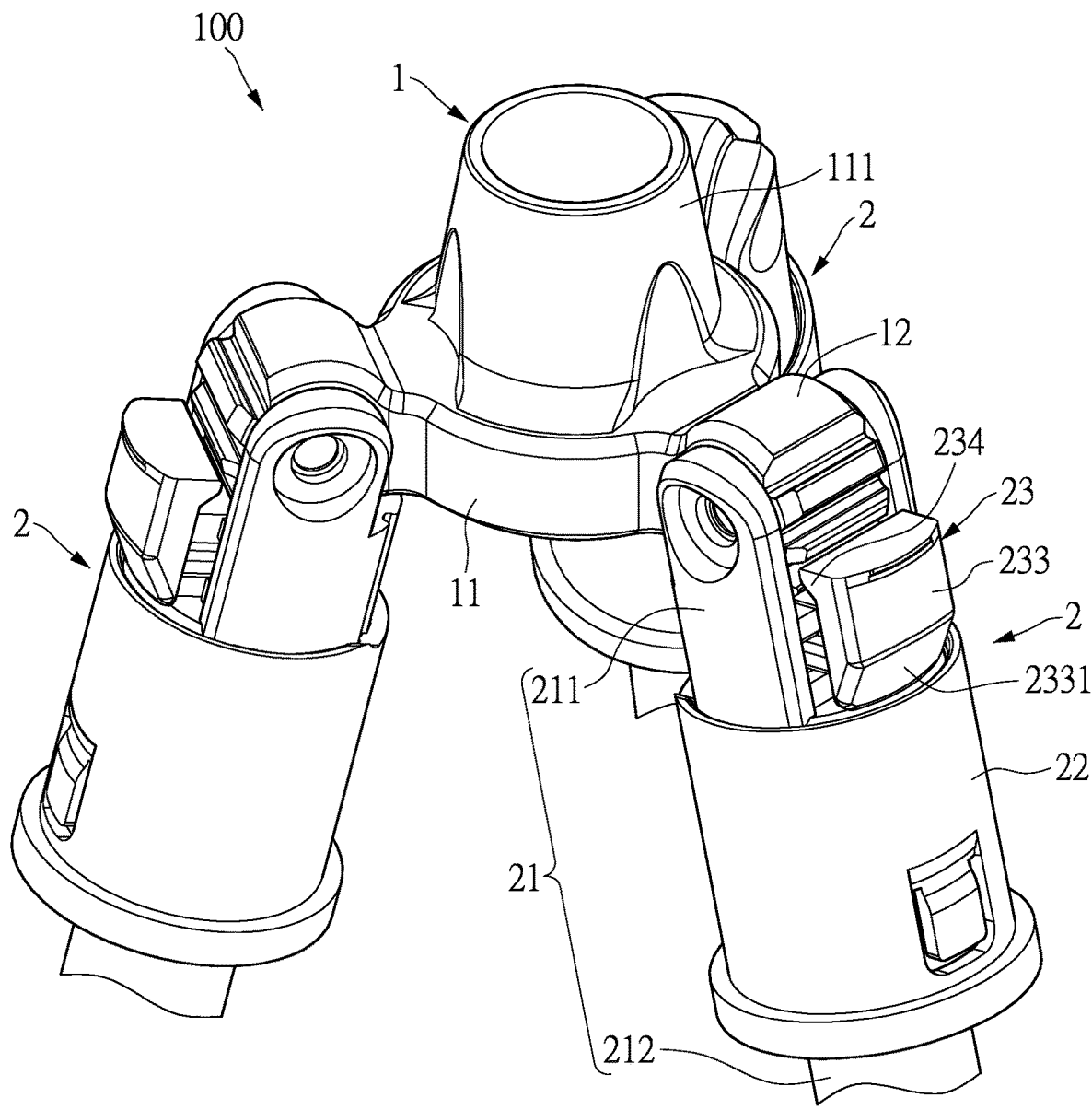
FIG. 2 is a partial enlarged view of the bracket according to the present disclosure.
Figure 3:
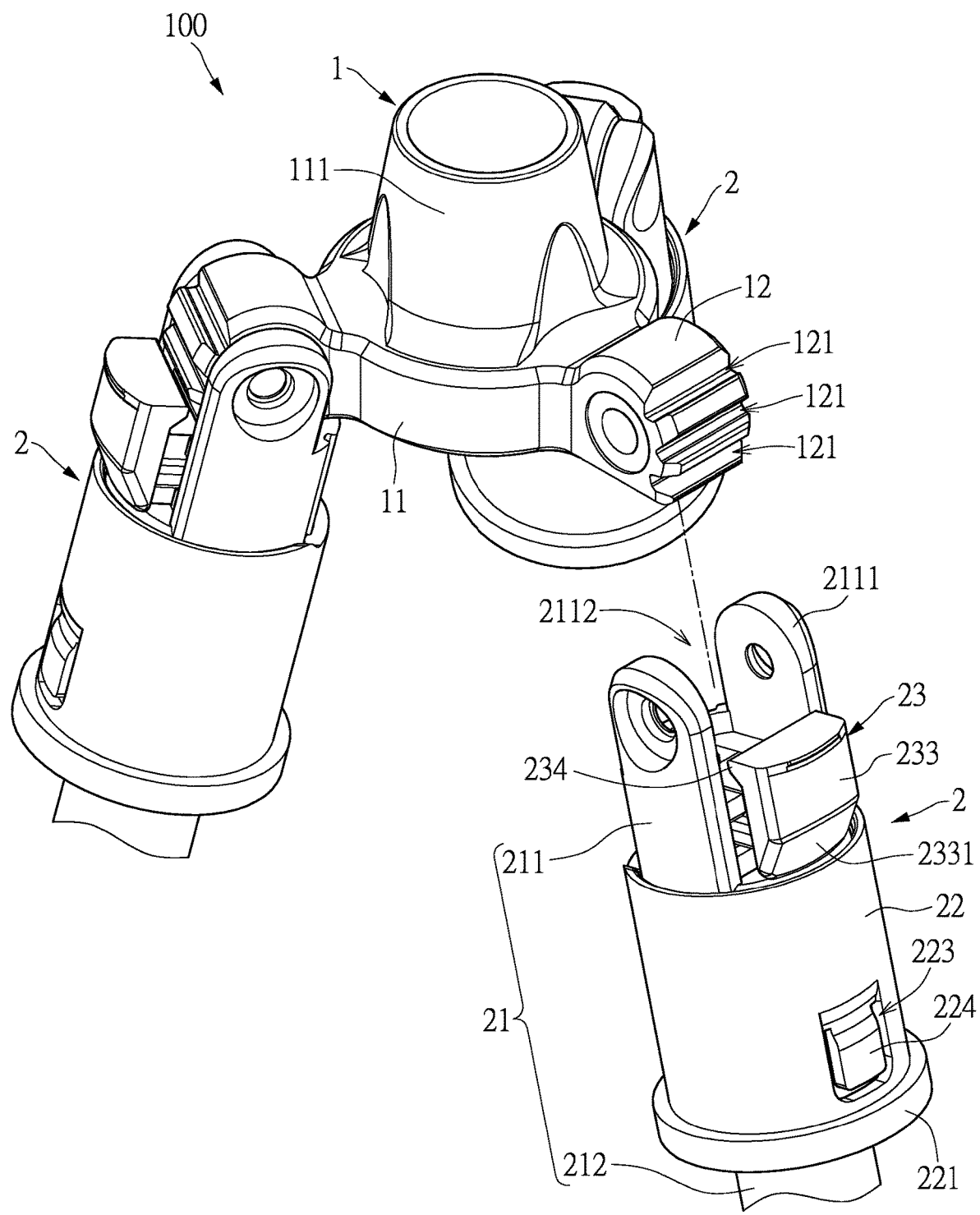
FIG. 3 is a partial enlarged view showing each sliding member of the bracket being arranged at an unlocked position according to the present disclosure.
Figure 4:
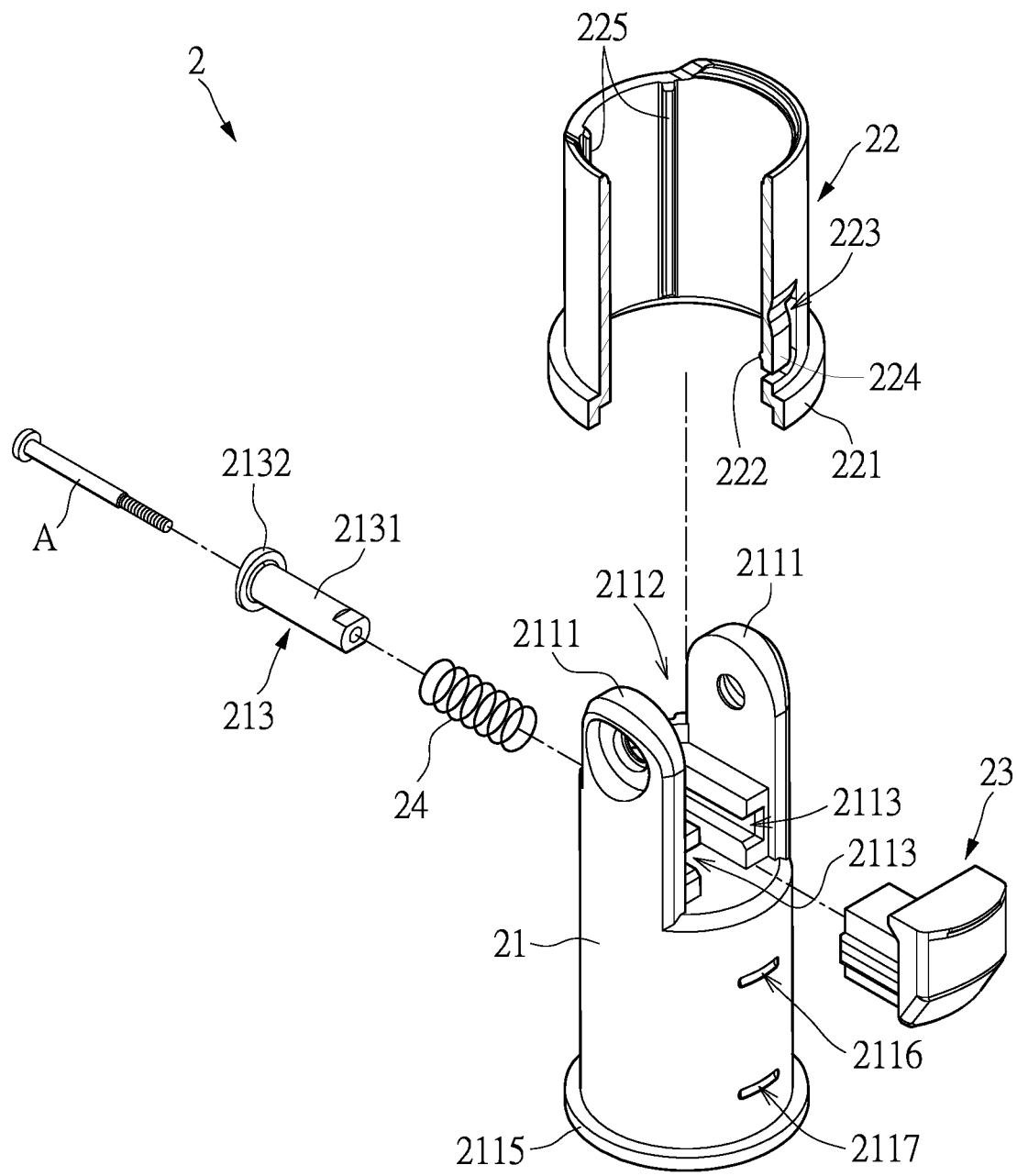
FIG. 4 is a partial exploded view of the bracket according to the present disclosure.
Figure 5:
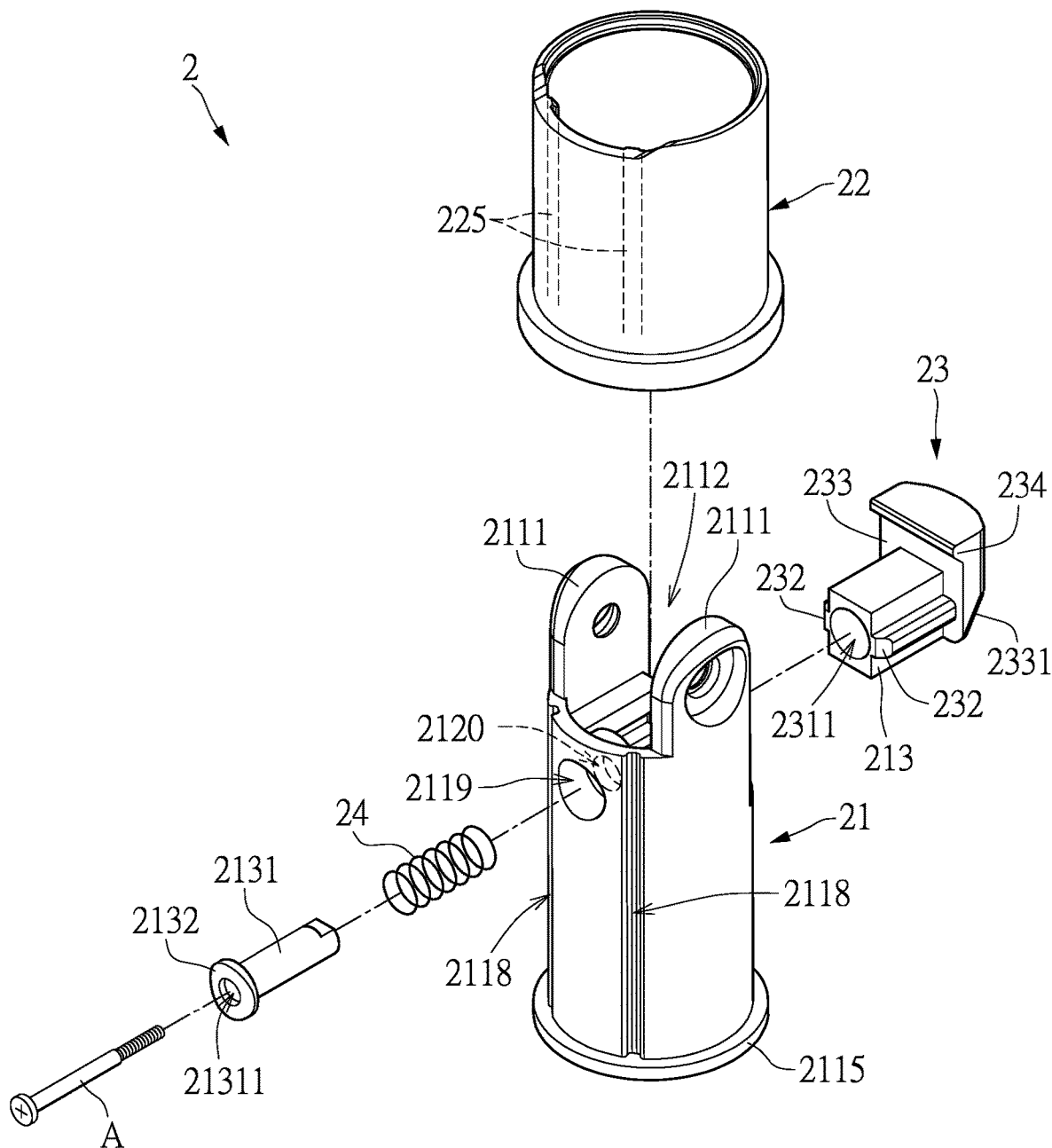
FIG. 5 is a schematic exploded view of a supporting assembly of the bracket according to the present disclosure.
Figure 6:
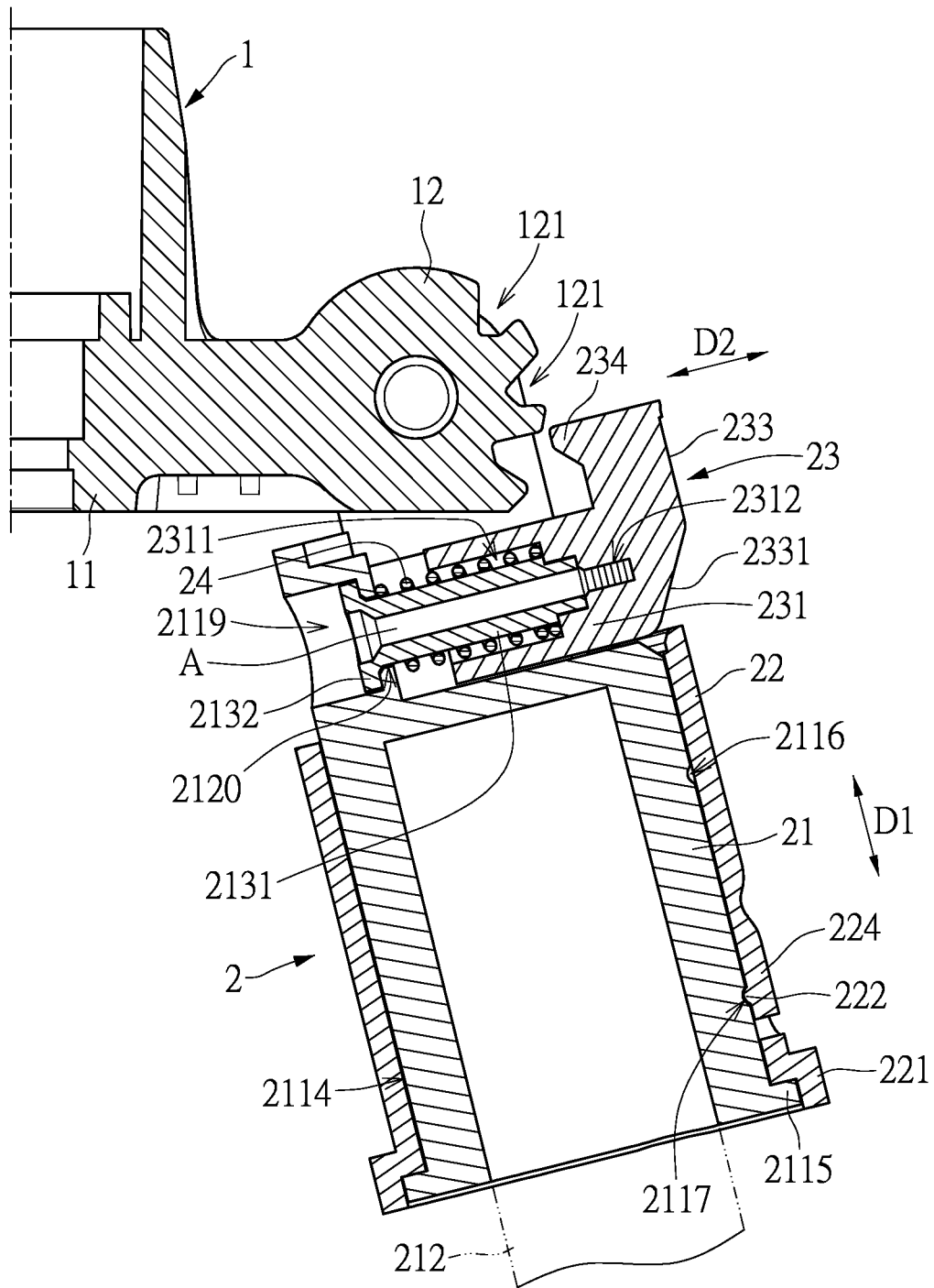
FIG. 6 is a partial cross-sectional view showing the sliding member of the bracket being arranged at the unlocked position according to the present disclosure.
Figure 7:
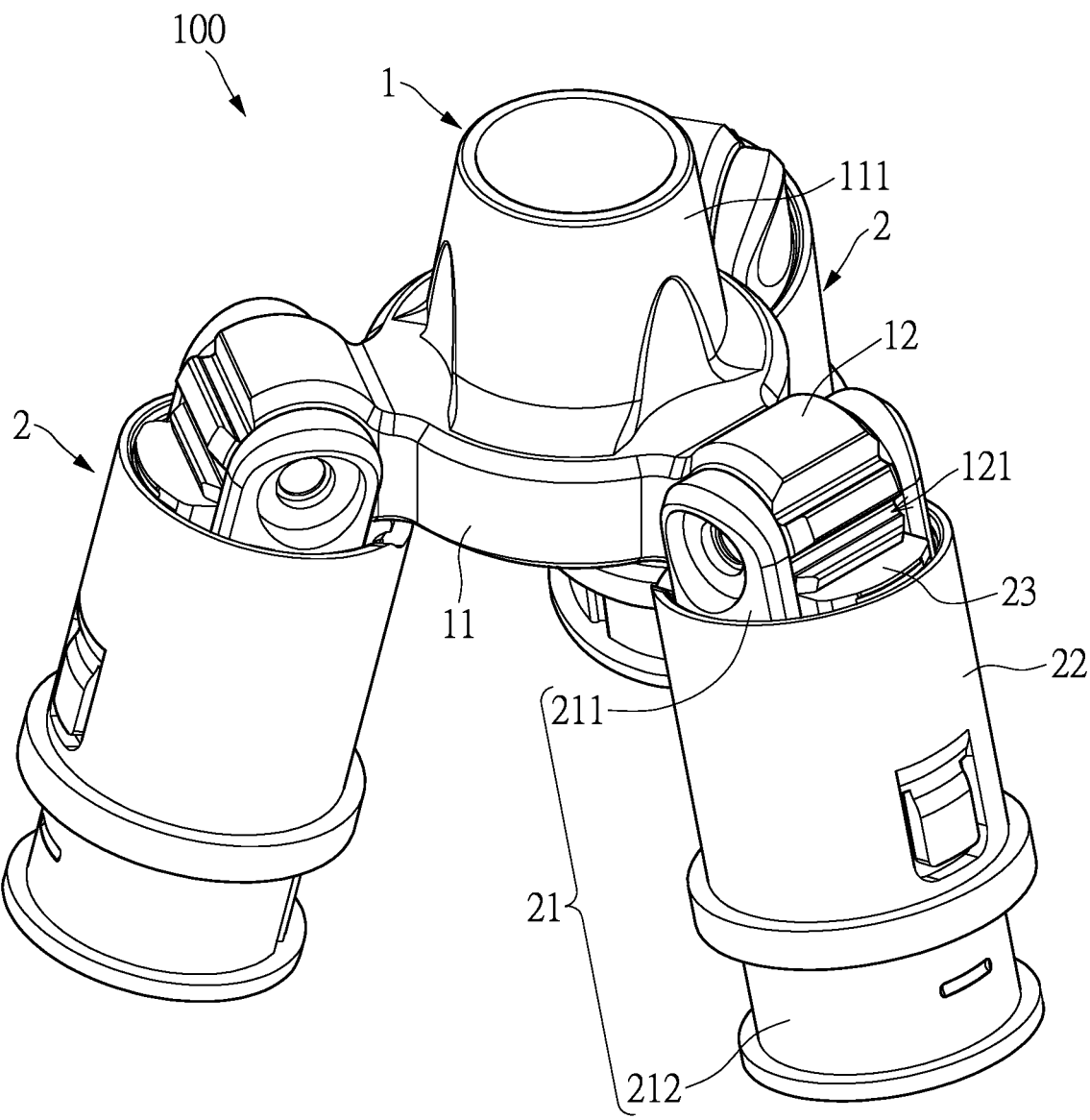
FIG. 7 is a partial enlarged view showing each sliding member of the bracket being arranged at a fixed position according to the present disclosure.

Referring to FIG. 1 to FIG. 6, FIG. 1 is a schematic view of a bracket of the present disclosure, FIG. 2 is a partial enlarged schematic view of the bracket of the present disclosure, FIG. 3 is a partial enlarged schematic view showing each of a plurality of sliding members is arranged at an unlocked position according to the bracket of the present disclosure, FIG. 4 is a partial exploded schematic view of the bracket of the present disclosure, FIG. 5 is an exploded schematic view of one of a plurality of the supporting assemblies of the bracket of the present disclosure, and FIG. 6 is a partial sectional schematic view showing one of the sliding members is arranged at the unlocked position according to the bracket of the present disclosure. A bracket 100 of the present disclosure can be disposed on a carrying surface (not shown). The carrying surface can be, for example, a ground surface or a table surface, but the present disclosure is not limited thereto. The bracket 100 of the present disclosure can be used to support different types of cameras, different types of lamps, and speakers, but the present disclosure is not limited thereto.

The bracket 100 includes a fixing seat 1 and three supporting assemblies 2. The fixing seat 1 includes a main body 231 and three engaging portions 12. The main body 231 can include a connection structure 111, and the connection structure 111 is used to be engaged with different types of cameras, different types of lamps, different types of speakers, different types of tripod heads, and different types of measuring apparatuses. The three engaging portions 12 are spaced apart from each other and connected to the main body 231. The main body 231 and the three engaging portions 12 can be integrally formed. Each of the engaging portions 12 includes a plurality of first engaging structures 121. Each of the first engaging structures 121 included in a corresponding one of the engaging portions 12 can be in a tooth shape. The quantity of the supporting assemblies 2 included in the bracket 100 is not limited to three. In other embodiments, the bracket 100 can include four or at least four supporting assemblies 2, and the quantity of the engaging portions 12 included in the fixing seat 1 corresponds to the quantity of the supporting assemblies 2.

Each of the supporting assemblies 2 includes a fixing assembly 21, a sliding member 22, an engaging member 23, and an elastic member 24. The three fixing assemblies 21 and the three engaging portions 12 are pivotally connected to each other, and each of the fixing assemblies 21 can be operated to rotate relative to a corresponding one of the engaging portions 12. It is worth mention that, in other embodiments, each of the supporting assemblies 2 can be provided without the elastic member 24.

The fixing assembly 21 includes a fixing member 211, a supporting foot 212, and an auxiliary member 213. One end of the fixing member 211 is pivotally connected to the fixing seat 1. In a practical application, two pivotal arms 2111 are disposed at the one end of the fixing member 211 that is pivotally connected to the fixing seat 1, the two pivotal arms 2111 are spaced apart from each other, and the fixing member 211 has an accommodating slot 2112 formed between the two pivotal arms 2111. The accommodating slot 2112 is configured to accommodate one of the engaging portions 12 of the fixing seat 1, and said engaging portion 12 is pivotally connected to the two pivotal arms 2111.

Another end of the fixing member 211 can be recessed to form a mounting slot 2114, one end of the supporting foot 212 is fixed in the mounting slot 2114, and another end of the supporting foot 212 is configured to abut against the carrying surface. In practice, the supporting foot 212 can be fixed to the fixing member 211 in a tight cooperation, and a glue can be filled between the supporting foot 212 and the fixing member 211. In one particular embodiment, the supporting foot 212 can be detachably fixed to the fixing member 211, and relevant personnel can change a different supporting foot 212 according to practical requirements. In other embodiments, the fixing member 211 and the supporting foot 212 can also be integrally formed.

The sliding member 22 can be in a cylindrical shape, the fixing member 211 can substantially be in a cylindrical shape, the sliding member 22 is sleeved around an outer periphery of the fixing member 211, and the sliding member 22 can be operated to slide relative to the fixing member 211. The shape and the size of the sliding member 22 and the fixing member 211 are not limited to those shown in the figures. As long as the sliding member 22 can be operated to slide relative to the fixing member 211, the shape and the size of the sliding member 22 and the fixing member 211 can be changed according to requirements.

In a practical application, a first retaining structure 2115 is disposed at another end of the fixing member 211 (which is opposite to the one end of the fixing member 211 that is pivotally connected to the fixing seat 1), and a second retaining structure 221 is disposed at one end of the sliding member 22 away from the fixing seat 1. The sliding member 22 can be sleeved from the one end of the fixing member 211 that is without the first retaining structure 2115, and the second retaining structure 221 of the sliding member 22 is adjacent to the first retaining structure 2115. When the sliding member 22 is operated to slide relative to the fixing member 211, and the second retaining structure 221 abuts against the first retaining structure 2115, a movement range of the sliding member 22 relative to the fixing member 211 is limited, and the sliding member 22 is unable to move in a direction away from the fixing member 1. The configuration of the first retaining structure 2115 and the second retaining structure 221 is mainly used to limit the movement range of the sliding member 22 and the fixing member 211. In other embodiments, the fixing member 211 and the sliding member 22 can be provided without the first retaining structure 2115 and the second retaining structure 221, and the movement range of the sliding member 22 relative to the fixing member 211 can be limited in other manners.

A first positioning structure 2116 and a third positioning structure 2117 can be disposed at an outer periphery of the fixing member 211, the first positioning structure 2116 and the third positioning structure 2117 are spaced apart from each other, and the first positioning structure 2116 and the third positioning structure 2117 can be recesses that are concavely formed on the outer periphery of the fixing member 211.

The sliding member 22 includes a second positioning structure 222, and the second positioning structure 222 can be correspondingly engaged with the first positioning structure 2116 and the third positioning structure 2117. When the second positioning structure 222 is engaged with the first positioning structure 2116 or the third positioning structure 2117, the movement range of the sliding member 22 relative to the fixing member 211 is limited.

In a practical application, the sliding member 22 can have an opening 223 and an elastic arm 224 arranged in the opening 223. The second positioning structure 222 can be a protrusion formed on the elastic arm 224. When the protrusion abuts against the outer periphery of the fixing member 211, the elastic arm 224 elastically deforms. In this way, when the sliding member 22 is operated to slide relative to the fixing member 211, the protrusion continuously abuts against the outer periphery of the fixing member 211 until the protrusion enters into one of the recesses.

In an exemplary embodiment, two first guiding structures 2118 are disposed at the outer periphery of the fixing member 211 two second guiding structures 225 are disposed at an inner side of the sliding member 22, and the sliding member 22 can move relative to the fixing member 211 along a first direction D1 through a cooperation of the second guiding structures 225 and the first guiding structures 2118. For example, each of the first guiding structures 2118 can be a strip-shaped slot, each of the second guiding structures 225 can be a column structure, and each of the column structures can slide in a corresponding one of the strip-shaped slots.

Through the configuration of the first guiding structures 2118 and the second guiding structures 225, when the sliding member 22 is operated to move relative to the fixing member 211, the sliding member 22 does not shake left and right, but moves along the first direction D1 (i.e., a length direction of the fixing member 211) in a relatively straight manner. In this way, a user can have a good operating feeling, and can smoothly control movement of the sliding member 22 relative to the fixing member 221. The shape, the position, the size, and the quantity of the first guiding structures 2118 and the second guiding structures 225 respectively included in the fixing member 211 and the sliding member 22 are not limited to those shown in the figures.

Figure 8:
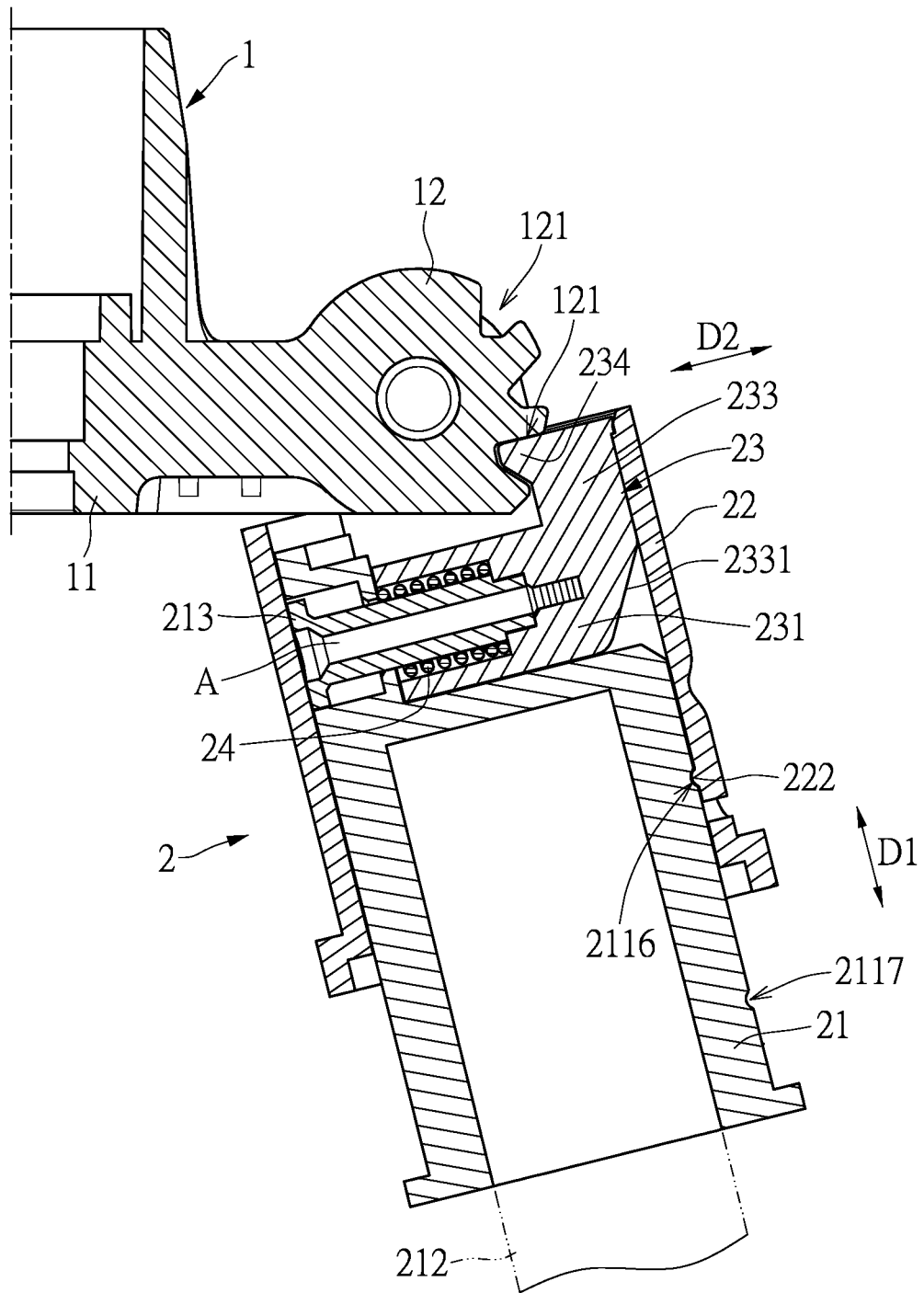
FIG. 8 is a schematic cross-sectional view showing the sliding member of the bracket being arranged at the fixed position according to the present disclosure.

In each of the supporting assemblies 2, the engaging member 23 is connected to the fixing assembly 21. The engaging member 23 is configured to move between an engagement position (as shown in FIG. 8) and a non-engagement position (as shown in FIG. 6) relative to the fixing assembly 21. In a practical application, the fixing member 211 has two guiding slots 2113 formed in the accommodating slot 2112. The engaging member 23 can have a main body 231, two guiding structures 232, and a guiding portion 233. The two guiding structures 232 are formed at two sides of the main body 231. The main body 231, each of the guiding structures 232, and the guiding portion 233 can substantially be in a cuboid shape. In a practical application, the main body 231, the two guiding structures 232, and the guiding portion 233 can be integrally formed.

The two guiding structures 232 are slidably disposed in the two guiding slots 2113 of the fixing member 211, and the engaging member 23 can move relative to the fixing member 211 along a second direction D2 through a cooperation of the two guiding structures 232 and the two guiding slots 2113 of the fixing member 211. The second direction D2 is not parallel to the first direction D1. Through the configuration of the guiding structures 232 and the guiding slots 2113, it can be ensured that the engaging member 23 can stably move along the second direction D2 when the engaging member 23 is being operated.

The main body 231 has a guiding portion 233 formed at one end thereof. A guiding bevel 2331 is formed at one end of the guiding portion 233 that is adjacent to a position where the guiding portion 233 is connected to the main body 231. Further, a second engaging structure 234 is formed at an inner side (i.e., one side facing toward the main body 231) of another end of the guiding portion 233. The second engaging structure 234 can be engaged with an adjacent one of the first engaging structures 121.

A groove 2311 and a keyhole 2312 are concavely formed at a position of the main body 231 away from the one end of the main body 231 connected to the guiding portion 233. A retaining groove 2119 is concavely formed at the outer periphery of the fixing member 211, the fixing member 211 further has a thru-hole 2120 penetrating there-through, and the thru-hole 2120, the retaining groove 2119, and the accommodating slot 2112 are in spatial communication with each other.

The auxiliary member 213 includes a main body 2131 and an abutting portion 2132. The main body 2131 has a hollow passage 21311 penetrating there-through. One portion of the main body 2131 penetrates through the thru-hole 2120, and is arranged in the groove 2311 of the engaging member 23. In addition, the hollow passage 21311 is in spatial communication with the keyhole 2312 of the engaging member 23. The abutting portion 2132 is formed at one end of the auxiliary member 213, an outer diameter of the abutting portion 2132 is greater than an outer diameter of the main body 2131, the outer diameter of the abutting portion 2132 is greater than an inner diameter of the thru-hole 2120 of the fixing member 211, and an outer diameter of the main body 2131 of the auxiliary member 213 is less than or equal to the inner diameter of the thru-hole 2120 of the fixing member 211. One portion of the auxiliary member 213 can penetrate into the fixing member 211 through the thru-hole 2120 from an outer side of the engaging member 23, and the abutting portion 2132 can correspondingly abut against a wall portion of the fixing member 211 that is formed into the retaining groove 2119.

When the abutting portion 2132 of the auxiliary member 213 abuts against the wall portion of the fixing member 211 that is formed into the retaining groove 2119, the thru-hole 2120 of the fixing member 211, the hollow passage 21311 of the engaging member 23, and the keyhole 2312 are in spatial communication with each other. Further, a screw A can be fixed with the keyhole 2312 by penetrating through the thru-hole 2120 and the hollow passage 21311, so that the engaging member 23 cannot be separated away from the fixing member 211. However, the engaging member 23 can be operated to move relative to the fixing member 211 along the second direction D2.

One end of the elastic member 24 is fixed to the fixing member 211, and another end of the elastic member 24 is fixed to the engaging member 23. When the engaging member 23 is operated to move toward the fixing member 211, the elastic member 24 is pressed to generate an elastic restoring force. When the engaging member 23 is no longer being operated, the elastic restoring force of the elastic member 24 allows the engaging member 23 to return to a state in which the engaging member 23 is not operated. In a practical application, the elastic member 24 can be a compressed spring, the compressed spring can be sleeved around an outer periphery of the auxiliary member 213, one end of the compressed spring can be fixed to one side of the fixing member 211 away from the retaining groove 2119, another end of the compressed spring is fixed to the engaging member 23, and one portion of the compressed spring can be correspondingly arranged in the groove 2311 of the engaging member 23.

Referring to FIG. 2, FIG. 6, FIG. 7, and FIG. 8, FIG. 7 is a partial enlarged schematic view showing each of the sliding members is arranged at a fixed position according to the bracket of the present disclosure, and FIG. 8 is a sectional schematic view showing one of the sliding members is arranged at the fixed position according to the bracket of the present disclosure. As shown in FIG. 2 and FIG. 6, when the second positioning structure 222 (i.e., the protrusion of the elastic arm 224) of the sliding member 22 is engaged with the third positioning structure 2117 (i.e., one of the recesses of the fixing member 211) of the fixing member 211, and the sliding member 22 is arranged at the unlocked position without covering the engaging member 23, the engaging member 23 is correspondingly arranged at the non-engagement position, and there is a gap between the second engaging structure 234 of the engaging member 23 and any adjacent one of the first engaging structures 121. At this time, the fixing assembly 21 can be operated to rotate relative to the fixing seat 1.

According to the above, when the engaging member 23 is arranged at the non-engagement position, the elastic member 24 is in an unpressed state, the guiding portion 233 of the engaging member 23 protrudes from the fixing member 211 and an outer periphery of the sliding member 22, and the guiding bevel 2331 of the guiding portion 233 is adjacent to one end of the sliding member 22. In addition, when the sliding member 22 is arranged at the unlocked position, the second retaining structure 221 of the sliding member 22 abuts against the first retaining structure 2115 of the fixing member 211. Under this circumstance, the user generally cannot easily move the sliding member 22 in a direction away from the fixing seat 1.

Referring to FIG. 2, FIG. 6, FIG. 7, and FIG. 8, when the sliding member 22 is operated to move relative to the fixing member 211 along the first direction D1 from the unlocked position to the fixed position, the second positioning structure 222 of the sliding member 22 is engaged with the first positioning structure 2116 of the fixing member 211, and the one end of the sliding member 22 adjacent to the guiding portion 233 pushes the guiding bevel 2331 of the guiding portion 233, such that the engaging member 23 moves relative to the fixing member 211 along the second direction D2 until the guiding portion 233 is accommodated in the sliding member 22. At this time, the positon of the engaging member 23 is changed from the non-engagement position to the engagement position, and the second engaging structure 234 is engaged with the adjacent one of the first engaging structures 121.

Referring to FIG. 8, when the engaging member 23 is arranged at the engagement position, and the outer periphery of the guiding portion 233 of the engaging member 23 is accommodated in the sliding member 22, the elastic member 24 is in a pressed state, and the elastic restoring force generated by the pressed elastic member 24 allows the engaging member 23 to push outward, such that an outer periphery of the guiding portion 233 tightly abuts against an inner side of the sliding member 22. In this way, a connection strength between the engaging member 23 and the sliding member 22 can be enhanced, and the second engaging structure 234 and the first engaging structure 121 are more tightly engaged with each other. In other words, the sliding member 22 arranged at the fixed position can keep the first engaging structure 121 and the second engaging structure 234 stably engaged with each other not only through the second retaining structure 221 and the first retaining structure 2115 but also through the assistance of the elastic member 24.

According to the above, when the sliding member 22 is arranged at the fixed position, the engaging member 23 is arranged at the engagement position, the second retaining structure 221 is engaged with the first retaining structure 2115, the second engaging structure 234 is engaged with the first engaging structure 121, and the engaging member 23 is stored at the inner side of the sliding member 22, the fixing assembly 21 cannot rotate relative to the fixing seat 1, and the fixing assembly 21 and the fixing seat 1 are fixed at a certain angle. At this time, the user can fix a device (e.g., a camera or a lamp) to the fixing seat 1.

As shown in FIG. 8 and FIG. 6, when the user wants to change the angle between the fixing seat 1 and the fixing assembly 21, the user only needs to apply a force onto the sliding member 22 such that the sliding member 22 moves along the first direction D1 away from the fixing seat 1 (until the second retaining structure 221 is engaged with the third positioning structure 2117). When the sliding member 22 is operated to move to the unlocked position, the inner side of the sliding member 22 no longer abuts against the outer periphery of the guiding portion 233 of the engaging member 23, and the engaging member 23 automatically moves along the second direction D2 away from the fixing member 211 due to the elastic member 24. Accordingly, the second engaging structure 234 is automatically not engaged with the first engaging structure 121. At this time, the user can adjust the angle between the fixing assembly 21 and the fixing seat 1.

In other words, when the sliding member 22 is arranged at the unlocked position, the elastic restoring force generated by the pressed elastic member 24 allows the engaging member 23 to return a position (i.e., the non-engagement position) where the engaging member 23 is not pushed by the sliding member 22, and the second engaging structure 234 moves in a direction away from the first engaging structure 121, such that the second engaging structure 234 is no longer engaged with the first engaging structure 121.

Simply put, the user only needs to operate the sliding member 22, the second engaging structure 234 of the engaging member 23 is automatically not engaged with the first engaging structure 121, and the user can operate the fixing assembly 21 to change the angle between the fixing assembly 21 and the fixing seat 1. After the user adjusts the angle between the fixing assembly 21 and the fixing seat 1, the user can also simply operate the sliding member 22 to the extent that the sliding member 22 pushes against the engaging member 23. In this way, the second engaging structure 234 can be engaged with the adjacent one of the first engaging structures 121.

It should be noted that, in one embodiment where each of the supporting assemblies 2 does not include the elastic member 24, when the user moves the sliding member 22 to the unlocked position, the engaging member 23 does not automatically move in a direction away from the fixing member 211. However, the user can still operate the engaging member 23, such that the second engaging structure 234 of the engaging member 23 is no longer fixed to the first engaging structure 121.

[Beneficial Effects of the Embodiment]

In conclusion, in the bracket provided by the present disclosure, through the configuration of the fixing seat, the engaging members, and the sliding members, the fixing assembly can be fixed with the fixing seat by the user simply operating the sliding member after the angle between the fixing assembly and the fixing seat is adjusted. Accordingly, the setup of the bracket is completed. When the user wants to re-adjust the angle between the fixing assembly and the fixing seat, the user only needs to operate the sliding member again (in cooperation with the engaging member or through the elastic member), so that the second engaging structure of the engaging member is no longer engaged with the first engaging structure. In this way, the fixing assembly is adjustable relative to the fixing seat. In other words, the bracket of the present disclosure allows the user to adjust the angel between each of the supporting assemblies of the bracket and the fixing seat through a simple operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bracket, which is configured to be disposed on a carrying surface, comprising:
   a fixing seat including at least three engaging portions, wherein each of the at least three engaging portions includes a plurality of first engaging structures; and
   at least three supporting assemblies, wherein each of the at least three supporting assemblies includes:
      a fixing assembly having one end pivotally connected to one of the at least three engaging portions, wherein the fixing assembly includes a first positioning structure;
      a sliding member sleeved around an outer periphery of the fixing assembly, wherein the sliding member includes a second positioning structure, and the second positioning structure is configured to be engaged with the first positioning structure; and
      an engaging member connected to the fixing assembly, wherein the engaging member is movable relative to the fixing assembly, the engaging member includes a second engaging structure, and the second engaging structure is configured to be engaged with any adjacent one of the first engaging structures;
   wherein the sliding member is operable to move between an unlocked position and a fixed position relative to the fixing assembly; wherein, when the sliding member moves from the unlocked position to the fixed position, the second engaging structure is engaged with the adjacent one of the first engaging structures due to the sliding member pushing against the engaging member, and the second positioning structure is engaged with the first positioning structure, such that a movement range of the engaging member is limited by the sliding member and the fixing assembly; wherein, when the sliding member moves to the unlocked positon, the engaging member is operable to move relative to the fixing assembly, such that the second engaging structure is no longer engaged with the adjacent one of the first engaging structures.

2. The bracket according to claim 1, wherein, when the sliding member is arranged at the fixed position, the engaging member is accommodated at an inner side of the sliding member, and an outer periphery of the engaging member abuts against the inner side of the sliding member.

3. The bracket according to claim 1, wherein the fixing assembly further includes a third positioning structure; wherein, when the sliding member is arranged at the unlocked position, the second positioning structure is engaged with the third positioning structure, and the engaging member is not arranged at an inner side of the sliding member.

4. The bracket according to claim 1, wherein each of the at least three supporting assemblies further includes an elastic member, one end of the elastic member is fixed to the fixing assembly, and another end of the elastic member is fixed to the engaging member; wherein, when the sliding member is arranged at the fixed position, the engaging member is pushed by the sliding member, and the elastic member is pressed to generate an elastic restoring force; wherein, when the sliding member moves from the fixed position to the unlocked position, and the sliding member no longer pushes against the engaging member, the elastic restoring force of the elastic member allows the engaging member to return to a position where the engaging member is not pushed by the sliding member, and the second engaging structure is changed from a state of being engaged with the first engaging structure to a state of not being engaged with the first engaging structure.

5. The bracket according to claim 4, wherein, when the sliding member is arranged at the fixed position, the engaging member is pushed by the sliding member, the elastic member is pressed to generate the elastic returning force, and the elastic returning force of the elastic member allows an outer periphery of the engaging member to abut against an inner side of the sliding member.

6. The bracket according to claim 1, wherein the sliding member of each of the at least three supporting assemblies includes an opening and an elastic arm arranged in the opening, the second positioning structure is a protrusion formed on the elastic arm, and the first positioning structure is a recess formed on the fixing assembly; wherein, when the protrusion abuts against the outer periphery of the fixing assembly, the elastic arm is elastically deformed.

7. The bracket according to claim 1, wherein the engaging member of each of the at least three supporting assemblies includes a guiding bevel; wherein, when the sliding member moves from the unlocked position to the fixed position relative to the fixing assembly along a first direction, one end of the sliding member pushes against the guiding bevel, such that the engaging member moves relative to the fixing assembly along a second direction; wherein the second direction is not parallel to the first direction.

8. The bracket according to claim 1, wherein the fixing assembly of each of the at least three supporting assemblies includes a fixing member and a supporting foot, one end of the fixing member is pivotally connected to the fixing seat, a first retaining structure is disposed at another end of the fixing member, a second retaining structure is disposed at one end of the sliding member away from the fixing seat, the second retaining structure is configured to abut against the first retaining structure, and the first retaining structure and the second retaining structure are configured to jointly limit a movement range of the sliding member relative to the fixing member; wherein the fixing member is fixed to one end of the supporting foot, and another end of the supporting foot is configured to abut against the carrying surface.

9. The bracket according to claim 8, wherein at least one first guiding structure is disposed at an outer periphery of the fixing member, at least one second guiding structure is disposed at an inner side of the sliding member, and the sliding member is configured to move relative to the fixing member along a first direction through cooperation of the at least one second guiding structure and the at least one first guiding structure.

10. The bracket according to claim 1, wherein the engaging member of each of the at least three supporting assemblies is configured to move between a non-engagement position and an engagement positon; wherein, when the engaging member is arranged at the non-engagement position, a gap is defined between the second engaging structure and any adjacent one of the first engaging structures, and the fixing assembly is operable to rotate relative to the fixing seat; wherein, when the sliding member is arranged at the fixed position, and the engaging member is arranged at the engagement position, the second engaging structure is engaged with the adjacent one of the first engaging structures, and the fixing assembly is unable to rotate relative to the fixing seat.

* * * * *